(12) United States Patent
Sakuragi (10) Patent No.: US 10,165,214 B2
(45) Date of Patent: Dec. 25, 2018

(54) IMAGING DEVICE AND IMAGING SYSTEM (71) Applicant: CANON KABUSHIKI KAISHA, Tokyo (JP)

(72) Inventor: Takamasa Sakuragi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 15/170,749

(22) Filed: Jun. 1, 2016

(65) Prior Publication Data

US 2016/0360137 A1 Dec. 8, 2016

(30) Foreign Application Priority Data

Jun. 5, 2015 (JP) ................................. 2015-115240

(51) Int. Cl.
H04N 5/378 (2011.01)
(52) U.S. Cl.
CPC .................. H04N 5/378 (2013.01)

(58) Field of Classification Search
CPC ....................................................... H04N 5/378
See application file for complete search history.

(56) References Cited

FOREIGN PATENT DOCUMENTS

JP 2012-109848 A 6/2012

*Primary Examiner* — Twyler L Haskins
*Assistant Examiner* — Angel L Garces-Rivera
(74) *Attorney, Agent, or Firm* — Canon U.S.A., Inc. IP Division (57) ABSTRACT

An imaging device according to an exemplary embodiment includes a plurality of pixels, a differential amplifier circuit that includes a plurality of transistors forming a differential pair, and a current source configured to supply a bias current to the plurality of transistors, and is configured to receive a signal from the plurality of pixels, a capacitor element including a first terminal and a second terminal, a first switch through which the first terminal is connected to an electric path between the current source and the plurality of transistors, and a second switch through which the first terminal is connected to a voltage supply node supplied with a voltage.

29 Claims, 8 Drawing Sheets

IMAGING DEVICE AND IMAGING SYSTEM

BACKGROUND OF THE INVENTION

Field of the Invention

One disclosed aspect of the embodiments relates to an imaging device and an imaging system.

Description of the Related Art

Recent imaging devices include a differential amplifier circuit. A differential amplifier circuit discussed in Japanese Patent Application Laid-Open No. 2012-109848 includes a slew rate adjustment unit including a variable capacitor connected in parallel with a current source circuit that drives an input stage. More specifically, a slew rate adjustment unit (414), illustrated in FIG. 3 in Japanese Patent Application Laid-Open No. 2012-109848, includes a variable capacitor including a first capacitor (C1) and a second capacitor (C2). The first capacitor has one terminal connected to a current source circuit (MN3) via a first switch (S1), and the other terminal grounded. The second capacitor has one terminal connected to the one terminal of the first capacitor via a second switch (S2), and the other terminal grounded. It is described in Japanese Patent Application Laid-Open No. 2012-109848 that this configuration can achieve a high slew rate without increasing current consumption.

SUMMARY OF THE INVENTION

Some embodiments are related to an imaging device and include: a photoelectric conversion unit; a differential amplifier circuit including a plurality of transistors forming a differential pair and a current source supplying a bias current to the plurality of transistors, and configured to receive a signal based on charge generated by the photoelectric conversion unit; a capacitor element including a first terminal and a second terminal; a first switch connecting the first terminal to an electric path between the current source and the plurality of transistors; and a second switch connecting the first terminal to a voltage supply node supplied with a voltage.

Further features of the disclosure will become apparent from the following description of exemplary embodiments with reference to the attached drawings.

DESCRIPTION OF THE EMBODIMENTS

In some exemplary embodiments, a high slew rate can be achieved without increasing power consumption in a differential amplifier circuit of an imaging device.

The differential amplifier circuit known to the inventor may have a problem in that a high slew rate is difficult to achieve. More specifically, a high slew rate may be achieved in the differential amplifier circuit through generation of current for charging the variable capacitor in the slew rate adjustment unit. However, when the variable capacitor is in a fully charged state, the current for charging the variable capacitor becomes low, or even becomes zero. As a result, it may take a certain amount of time to discharge the variable capacitor.

Some embodiments of the present disclosure are directed to an imaging device including a differential amplifier circuit capable of increasing a slew rate without increasing power consumption.

Figure 1A:
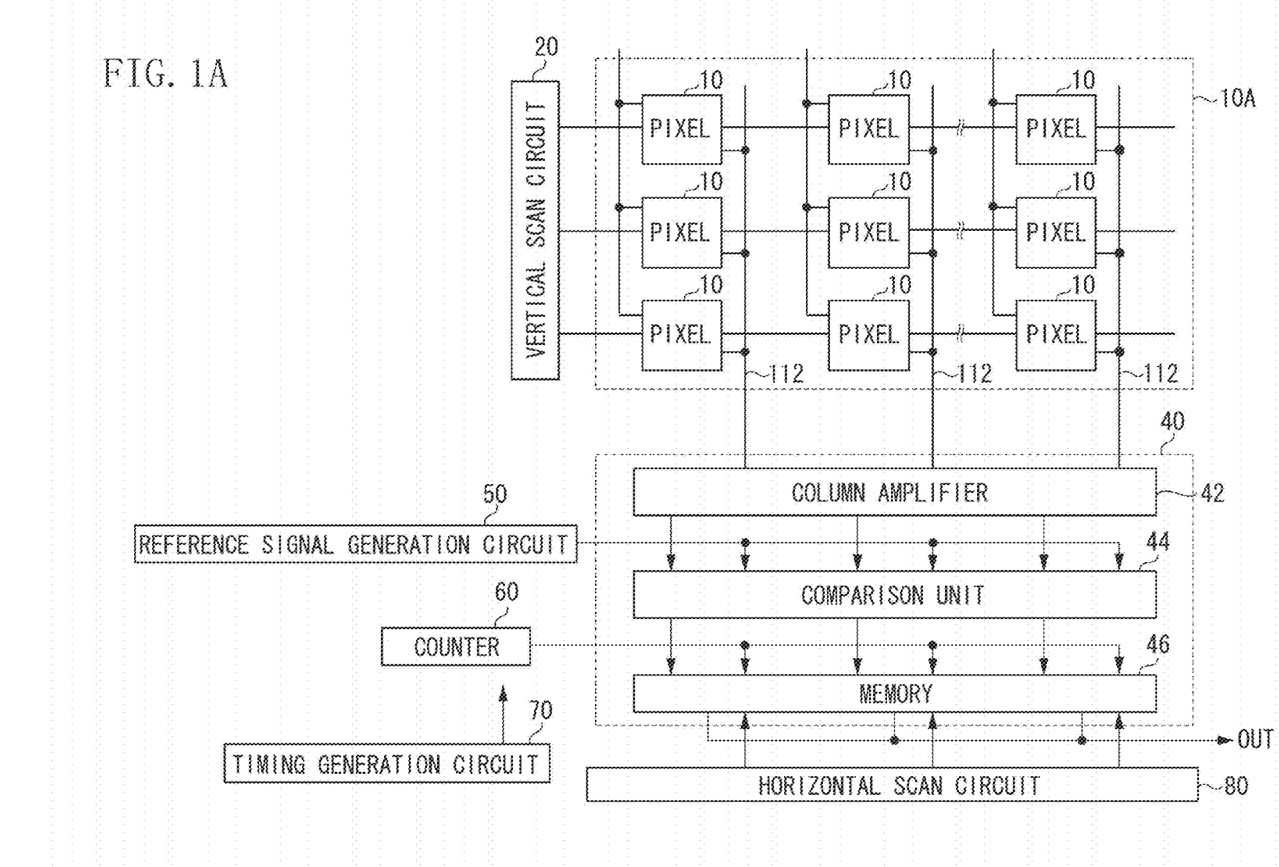
FIG. 1A is a diagram schematically illustrating a configuration of an imaging device.

An exemplary embodiment is described with reference to the drawings. FIG. 1A is a block diagram schematically illustrating an overall configuration of an imaging device according to the present exemplary embodiment. A pixel array 10A includes a plurality of pixel columns each including a plurality of pixels 10. FIG. 1A illustrates nine pixels 10 forming three pixel rows and three pixel columns. A plurality of pixels 10 in a single pixel column is connected to a corresponding one of output lines 112. A plurality of pixels 10 in one of the pixel rows is selected by a drive signal from a vertical scan circuit 20. Signals from the plurality of pixels 10 in the selected one pixel row are output in parallel to the plurality of output lines 112 based on a drive signal from the vertical scan circuit 20. This control is performed one by one on the plurality of pixel rows, whereby signals from the pixel array 10A are output to the output lines 112. The number of pixels 10 and the number of pixel columns are not limited to those described above.

The imaging device includes a plurality of signal processing circuits 40. In some exemplary embodiments, a plurality of read circuits is provided for the plurality of respective pixel columns. More specifically, each of the plurality of signal processing circuits 40 is provided for the corresponding one of the plurality of respective pixel columns. Furthermore, the signal processing circuit 40 corresponding to none of the pixel columns may be provided.

Each of the signals output to the output line 112 is input to the corresponding one of the signal processing circuits 40. Thus, the signal processing circuit 40 is configured to receive the signal output to the output line 112. The signal processing circuit 40 executes processing, such as amplifying, buffering, comparing, sample/hold, and analog to digital conversion (hereinafter, referred to as AD conversion), on the signal output to the output line 112. A circuit that transmits a signal, such as a buffer, a switch, an amplification circuit, or a clamp circuit, may be arranged on an electric path between the output line 112 and the signal processing circuit 40.

The signal processing circuit 40 includes a column amplifier 42 that amplifies the signal from the output line 112, and an analog to digital conversion circuit (hereinafter, referred to as an AD conversion circuit) that converts the signal from the output line 112 into a digital signal. The AD conversion circuit includes a comparison unit 44 and a memory 46. A reference signal generated by a reference signal generation circuit 50 is input to the comparison unit 44. The comparison unit 44 compares the signal output to the output line 112 with the reference signal. The memory 46 stores a count value of a counter 60 at a timing when an output from the comparison unit 44 is inverted. The count value, stored in the memory 46, is read as a digital signal based on a drive signal from a horizontal scan circuit 80. The vertical scan circuit 20, the column amplifier 42, the comparison unit 44, the memory 46, the reference signal generation circuit 50, the counter 60, and the horizontal scan circuit 80 are controlled based on a clock signal supplied from a timing generation circuit 70.

The signal processing circuit 40, illustrated in FIG. 1A, converts a signal from the pixel 10, which is an analog signal, into a digital signal. A modification may be employed in which the signal processing circuit 40 outputs the analog signal from the pixels 10 without converting it to the outside of the imaging device. In this case, the AD conversion circuit is omitted. Another modification may be employed in which the column amplifier 42 is omitted. In this case, the output lines 112 are connected to the comparison unit 44 of the AD conversion circuit.

A single block in the signal processing circuit 40, illustrated in FIG. 1A, represents one of a plurality of components in the plurality of respective signal processing circuits 40. For example, a single block representing the column amplifier 42 in FIG. 1A indicates that the plurality of signal processing circuits 40 each includes the column amplifier 42.

Figure 1B:
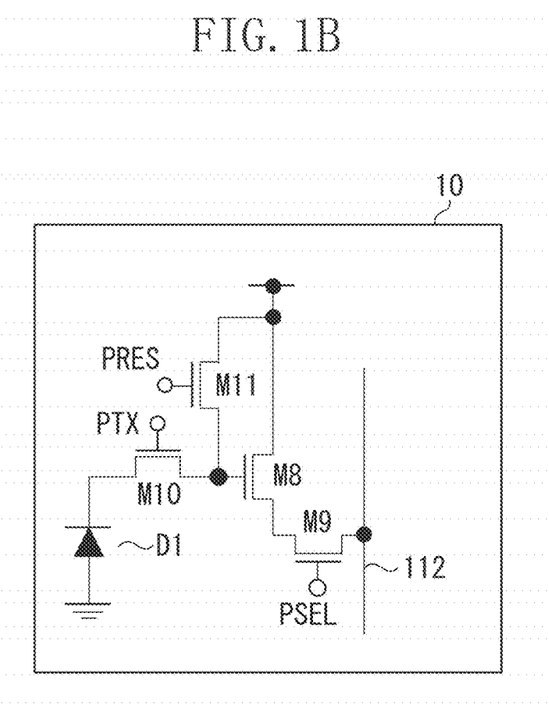
FIG. 1B is an equivalent circuit diagram of a pixel.

Next, a configuration of each of the pixels 10 will be described. FIG. 1B is an equivalent circuit diagram of the pixel 10. FIG. 1B illustrates a configuration of a single pixel 10, and this configuration is common to the other pixels 10.

The pixel 10 includes a photoelectric conversion unit including a photodiode D1, an amplification transistor M8, a selection transistor M9, a transfer transistor M10, and a reset transistor M11. The photoelectric conversion unit generates charge based on the received light. The transfer transistor M10 transfers the charge, generated by the photoelectric conversion unit, to a gate of the amplification transistor M8. The reset transistor M11 resets the voltage of the gate of the amplification transistor M8. The selection transistor M9 controls connection between the amplification transistor M8 and the output line 112. A drive signal PSEL, a drive signal PTX, and a drive signal PRES are supplied to respective gates of the selection transistor M9, the transfer transistor M10, and the reset transistor M11.

The amplification transistor M8 of the pixel 10 is connected to a current source (not illustrated) via the output line 112. In this configuration, the amplification transistor M8 forms a source follower circuit. When the selection transistor M9 is ON, the amplification transistor M8 outputs a signal based on the charge generated by the photoelectric conversion unit to the output line 112. In this specification, the signal, based on the charge generated by the photoelectric conversion unit, is also referred to as a signal from the pixel 10.

Figure 2:
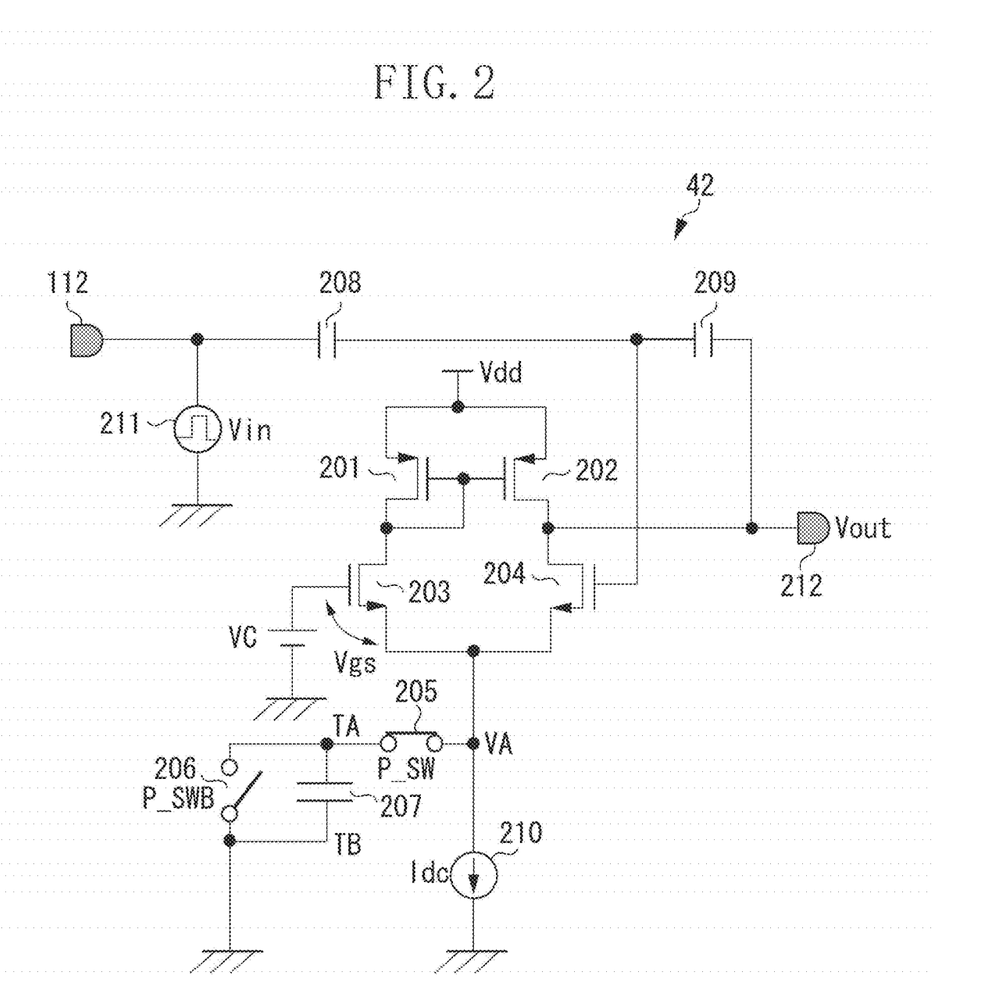
FIG. 2 is an equivalent circuit diagram of the imaging device.

The column amplifier 42 and the comparison unit according to the present exemplary embodiment each include a differential amplifier circuit. The differential amplifier circuit includes a plurality of transistors forming a differential pair, and a current source that supplies bias current to the plurality of transistors. FIG. 2 illustrates examples of a plurality of transistors 203 and 204, forming the differential pair, and a current source 210.

The imaging device according to the present exemplary embodiment includes a capacitor element having a first terminal and a second terminal. The first terminal of the capacitor element is connected to an electric path between the current source and the plurality of transistors forming the differential pair. The first terminal of the capacitor element is connected to a voltage supply node to which predetermined voltage is supplied via the second switch. FIG. 2 illustrates examples of a capacitor element 207, a first switch 205, and a second switch 206.

In this configuration, a high slew rate can be achieved without increasing current consumption. More specifically, the voltage of the first terminal of the capacitor element can be reset to the voltage of the voltage supply node, by turning on the second switch. Then, the current for charging the capacitor element can be supplied to the differential pair as bias current by turning on the first switch after the resetting. Thus, the voltage of the first terminal of the capacitor element can be reset at a desired timing by controlling the first switch and the second switch, whereby a high slew rate can be achieved easily.

Some exemplary embodiments are described below. The description on the following exemplary embodiments applies to all the exemplary embodiments unless specifically described otherwise. Each of the following exemplary embodiments represents an example of an imaging device, and can be modified as appropriate. A part of a configuration of any of the exemplary embodiments described below may be partially replaced with a part of another exemplary embodiment, or may be added to another exemplary embodiment.

A first exemplary embodiment will be described below. An example differential amplifier circuit used in an imaging device is described. FIG. 2 is an equivalent circuit diagram of the column amplifier 42 illustrated in FIG. 1A.

The column amplifier 42 includes a differential amplifier circuit. The transistor 203 and the transistor 204 form the differential pair in the differential amplifier circuit, and are each an N-channel MOS transistor. Sources of the transistor 203 and the transistor 204 are connected to a ground node, to which ground voltage is supplied, via the current source 210. The current source 210 supplies a bias current Idc to the plurality of transistors 203 and 204 forming the differential pair. For example, the current source 210 includes an N-channel MOS transistor. A gate ground circuit, a switch, and the like may be arranged on the electric path between the current source 210 and the differential pair.

Drains of the transistor 203 and the transistor 204 are each connected to a power supply node, to which power supply voltage Vdd is supplied, respectively via a load transistor 201 and a load transistor 202. The load transistor 201 and the load transistor 202 form a current mirror circuit, and are each a P-channel MOS transistor. A load such as a resistor may be connected to each of the drains of the transistor 203 and the transistor 204, instead of the current mirror circuit.

A gate of the transistor 203 serves as a first input node of the differential amplifier circuit. A gate of the transistor 204 serves as a second input node of the differential amplifier circuit. The drain of the transistor 204 serves as an output node 212 of the differential amplifier circuit.

A capacitor element 208 and a capacitor element 209 form a negative feedback network. The capacitor element 208 has one terminal connected to the output line 112 and the other terminal connected to the gate of the transistor 204. The capacitor element 209 has one terminal connected to the gate of the transistor 204 and the other terminal connected to the output node 212.

A reference voltage VC is input to the gate (first input node) of the transistor 203. A signal Vin output from the pixel 10 to the output line 112 is input to the gate (second input node) of the transistor 204 via the capacitor element 208. With this configuration, the differential amplifier circuit forms an inverting amplifier circuit that amplifies the signal Vin from the pixel 10.

The column amplifier 42 according to the present exemplary embodiment includes the capacitor element 207, the first switch 205, and the second switch 206. The capacitor element 207 includes a first terminal TA and a second terminal TB. The first terminal TA is connected to an electric path between the current source 210 and the plurality of transistors 203 and 204, forming the differential pair, via the first switch 205. The first terminal TA is connected to the voltage supply node, to which the predetermined voltage is supplied, via the second switch 206. The predetermined voltage is set in such a manner that the voltage (voltage VA) of the source of the transistor 203 is set to be a value between the predetermined voltage, supplied to the voltage supply node, and the voltage (reference voltage VC) of the gate of the transistor 203. In the present exemplary embodiment, the ground voltage is supplied as the predetermined voltage. Thus, the first terminal TA is connected to the ground node via the second switch 206, and the second terminal TB is connected to the ground node.

The first switch 205 is controlled by a control signal P_SW. The second switch 206 is controlled by a control signal P_SWB. In the present exemplary embodiment, the control signal P_SW and the control signal P_SWB are signals of opposite phases. Thus, the first switch 205 and the second switch 206 operate in opposite phases. More specifically, the second switch 206 is OFF when the first switch 205 is ON, and the second switch 206 is ON when the first switch 205 is OFF. The first switch and the second switch may be controlled independently from each other by control signals that are not correlated with each other.

Figure 3:
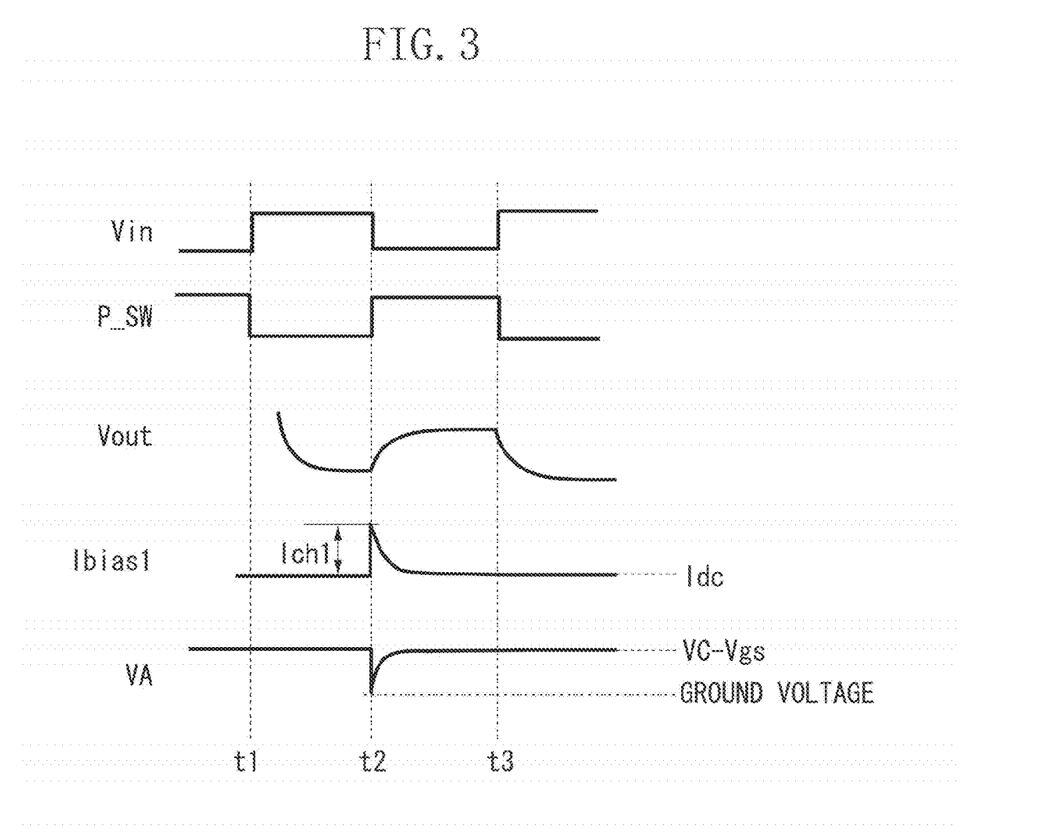
FIG. 3 is a diagram schematically illustrating operations of the imaging device.

Next, an operation of the imaging device according to the present exemplary embodiment is described. FIG. 3 illustrates input voltage Vin from the output line 112, the control signal P_SW, output voltage Vout, bias current Ibias1 supplied to the differential pair, and voltage VA of the source of the transistor 203. The input voltage Vin represents a level of the signal from the pixel 10. The control signal P_SWB is a signal having a phase opposite to that of the control signal P_SW, that is, a signal obtained by inverting the control signal P_SW, and thus is not illustrated.

First, the input voltage Vin is at a low level. In this state, the control signal P_SW is at a high level, and thus the first switch 205 is ON and the second switch 206 is OFF.

The input voltage Vin changes to be a high level at a time point t1. For example, the input voltage Vin may change as described above when the amplification transistor M8 outputs a signal in a state where the voltage of the date of the amplification transistor M8 is reset.

The control signal P_SW transfers from the high level to the low level at a timing at which the level of the input voltage Vin changes. Thus, the first switch 205 turns OFF and the second switch 206 turns ON at the timing at which the level of the input voltage Vin changes.

When the second switch 206 is turned ON, the voltage of the first terminal TA of the capacitor element 207 is reset to the ground voltage, and thus the capacitor element 207 is discharged. In this state, the first switch 205 is OFF, and thus the differential amplifier circuit is performing an operation of amplifying the input signal. In other words, the output voltage Vout of the output node 212 of the differential amplifier circuit drops to a predetermined level in accordance with a ratio of capacity (voltage gain) between the capacitor element 208 and the capacitor element 209 as the input voltage Vin changes.

At a time point t2, the input voltage Vin changes to be at the low level. For example, the input voltage Vin may change as described above when the transfer transistor M10 transfers the charge in the pixel 10.

The control signal P_SW transfers to the high level from the low level at the timing at which the level of the input voltage Vin changes. Thus, the first switch 205 turns ON and the second switch 206 turns OFF at the timing at which the level of the input voltage Vin changes.

The voltage VA of the source of the transistor 203 is at a level obtained by subtracting voltage Vgs across the gate and the source of the transistor 203 from the reference voltage VC before the time point t2. The ground voltage is supplied to the first terminal TA of the capacitor element 207 before the time point t2. Thus, when the first switch 205 is turned ON at the time point t2, the voltage VA of the source of the transistor 203 drops to the ground voltage, and the voltage across the gate and the source of the transistor 203 increases to be approximately equal to the reference voltage VC. As a result, transient charge current Ich1 flows to the capacitor element 207.

In FIG. 3, Ibias1 represents the total bias current supplied to the differential pair of the differential amplifier circuit. The transient charge current Ich1 is added to the bias current Idc, supplied by the current source 210, immediately after the time point t2. Thus, the driving power of the differential amplifier circuit increases and the output voltage Vout of the output node 212 promptly reaches a predetermined level. As a result, the slew rate of the differential amplifier circuit improves.

Formula (1) represents the bias current Ibias1. Formula (2), using the bias current Ibias1 and an equivalent load capacity Cf of the output node 212, represents a slew rate SR(Vout) of the output voltage Vout of the output node 212. The equivalent load capacity Cf is combined capacities of the capacitor elements 208 and 209 in series.

$$Ibias1 = Idc + Ich1 \quad (1)$$

$$SR(Vout) = Ibias1/Cf \quad (2)$$

Formula (2) indicates that the amount of change of the output voltage Vout per unit time, that is, the slew rate increases as the charge current Ich1 increases.

The transient charge current Ich1 that decreases over time corresponds to an added amount of the bias current Ibias1. Thus, an integrated amount of current can be reduced, whereby the current consumption can be reduced.

The operation at the time point t1 is repeated after the time point t3. Thus, the operation after the time point t3 will not be described. A period between the time points t1 and t2 and a period between the time points t2 and t3 can be set as appropriate.

As described above, in the present exemplary embodiment, the voltage of the first terminal TA of the capacitor element 207 can be reset to the predetermined voltage via the second switch 206. Therefore, after the resetting, the charge current for charging the capacitor element 207 can be added to the bias current of the differential amplifier circuit. As a result, a higher slew rate, that is, a faster response of an amplification circuit can be achieved without increasing the power consumption.

With the first switch 205 and the second switch 206 operating in opposite phases, the resetting and the charging of the capacitor element 207 can be easily controlled.

The differential amplifier circuit according to the present exemplary embodiment forms the inverting amplifier circuit. However, it is not limited thereto, and the differential amplifier circuit may form a non-inverting amplifier circuit or other amplifier circuits.

The conductivity type of the transistors in the column amplifier 42 may be different from that described above. For example, the plurality of transistors 203 and 204, forming the differential pair, may each be a P-channel MOS transistor. In this case, the power source voltage Vdd is supplied as the predetermined voltage to the voltage supply node. More specifically, the first terminal TA is connected to a power source node, to which the power source voltage Vdd is supplied, via the second switch 206, and the second terminal TB of the capacitor element 207 is connected to the power source node.

As described above, in the present exemplary embodiment, the slew rate can be enhanced without increasing the power consumption in the differential amplifier circuit in the imaging device.

Figure 4:
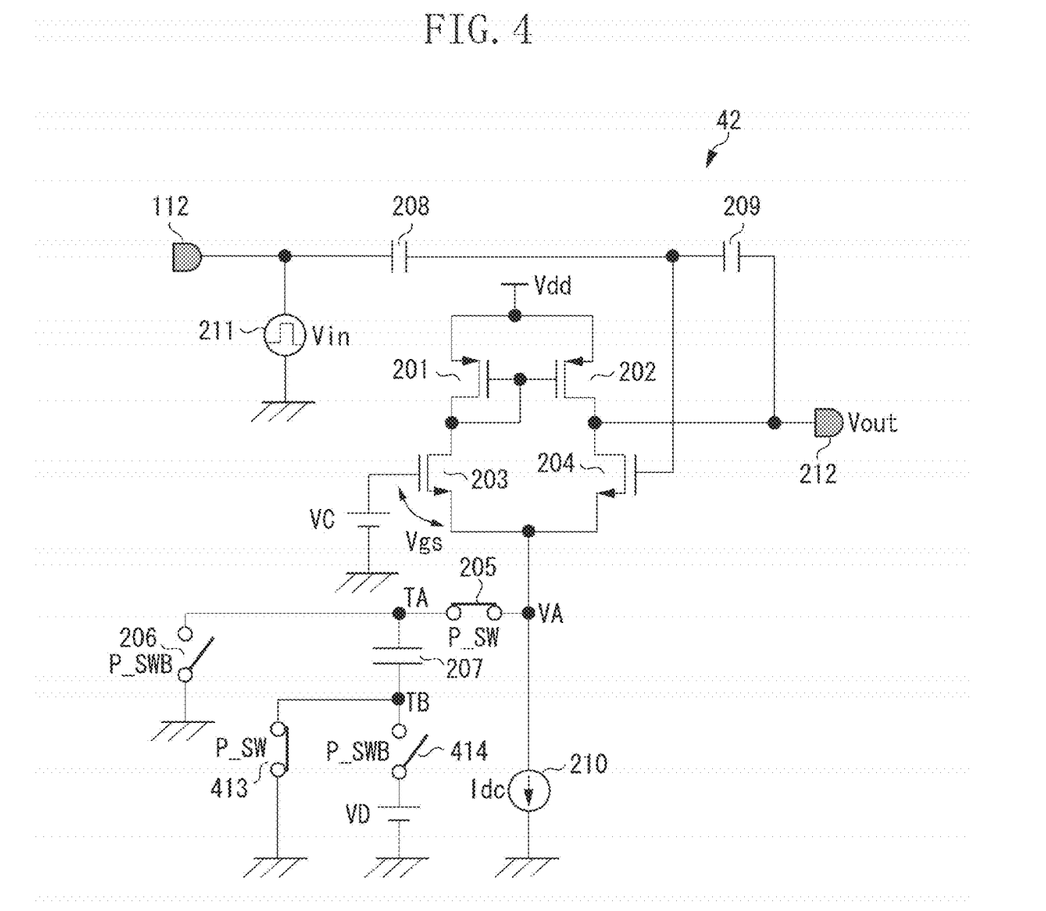
FIG. 4 is an equivalent circuit diagram of an imaging device.

A second exemplary embodiment of a differential amplifier circuit used in an imaging device is described. FIG. 4 is an equivalent circuit diagram of the column amplifier 42 illustrated in FIG. 1. Portions having functions that are the same as those in FIG. 2 are denoted with the same reference numerals, and will not be described in detail. Thus, the difference from FIG. 2 will be described herein.

In the present exemplary embodiment, a first voltage and a second voltage that is different from the first voltage are selectively supplied to the second terminal TB of the capacitor element 207. The second terminal TB is connected to the ground node, supplied with the ground voltage, via a third switch 413. In the present exemplary embodiment, the ground voltage is used as the first voltage. The second terminal TB is further connected to a node supplied with the voltage VD, via a fourth switch 414. In the present exemplary embodiment, a voltage VD, higher than the ground voltage, is used as the second voltage.

In the present exemplary embodiment, the ground voltage is supplied to the second terminal TB of the capacitor element 207 when the first switch 205 is ON. The voltage VD is supplied to the second terminal TB of the capacitor element 207 when the first switch 205 is OFF.

The third switch 413 is controlled by the drive signal P_SW. The fourth switch 414 is controlled by the drive signal P_SWB. Therefore, the first switch 205 and the third switch 413 operate in the same phase. The second switch 206 and the fourth switch 414 operate in the same phase. The number of lines can be reduced by using control signals of the same phase. The third switch 413 and the fourth switch 414 may be controlled with respective control signals independent from each other.

Figure 5:
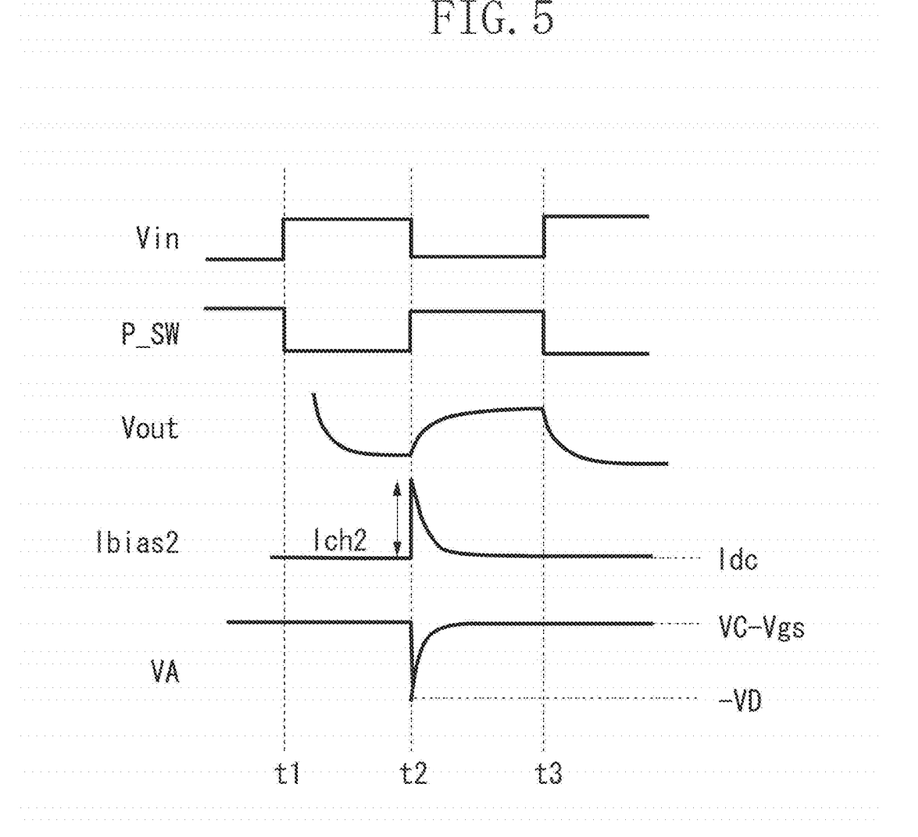
FIG. 5 is a diagram schematically illustrating operations of the imaging device.

Operations of the imaging device according to the present exemplary embodiment are described. FIG. 5 illustrates the input voltage Vin from the output line 112, the control signal P_SW, the output voltage Vout, the bias current Ibias2 supplied to the differential pair, and the voltage VA of the source of the transistor 203. The input voltage Vin represents the level of the signal from the pixel 10. The control signal P_SWB is a signal with a phase opposite to that of the control signal P_SW, that is, a signal obtained by inverting the control signal P_SW, and thus is omitted in the figure. Portions similar to those in FIG. 3 will not be described.

In a period between the time point t1 and the time point t2, the control signal P_SW is at the low level. Therefore, the first switch 205 and the third switch 413 are OFF, whereas the second switch 206 and the fourth switch 414 are ON. In this state, the ground voltage is supplied to the first terminal TA of the capacitor element 207, and the voltage VD is supplied to the second terminal TB of the capacitor element 207. In other words, the voltage of the first terminal TA is reset to be a voltage lower than the voltage of the second terminal TB by the voltage VD.

At the time point t2, the control signal P_SW transfers to the high level. Thus, the first switch 205 and the third switch 413 are turned ON, whereas the second switch 206 and the fourth switch 414 are turned OFF. The ground voltage is supplied to the second terminal TB of the capacitor element 207. The voltage of the first terminal TA of the capacitor element 207 is maintained at the voltage lower than the voltage of the second terminal TB by the voltage VD. Therefore, the voltage VA of the source of the transistor 203 is at a level lower than the ground voltage by the voltage VD, whereby the voltage between the gate and the source of the transistor 203 is set to be approximately the same as the sum of the reference voltage VC and the voltage VD. As a result, the transient charge current Ich2 flows into the capacitor element 207. The charge current Ich2 is larger than the transient charge current Ich1 according to the first exemplary embodiment, because the voltage across the gate and the source of the transistor 203 is larger. Thus, the present exemplary embodiment can achieve a slew rate higher than that according to the first exemplary embodiment.

Also in the present exemplary embodiment, the conductivity type of the transistors in the column amplifier 42 can be changed. In this case, the power source voltage Vdd is used as the first voltage. More specifically, the second terminal TB of the capacitor element 207 is connected to a power source node, supplied with the power source voltage Vdd, via the third switch 413. A voltage lower than the power source voltage Vdd is used as the second voltage.

The slew rate can be increased regardless of the conductivity type of the transistors, with the first voltage switched to the second voltage, so that the charge current flowing into the capacitor element 207 increases, at the timing at which the first switch 205 is turned ON.

As described above, according to the present exemplary embodiment, the slew rate can be increased without increasing the power consumption in the differential amplifier circuit of the imaging device.

Figure 6:
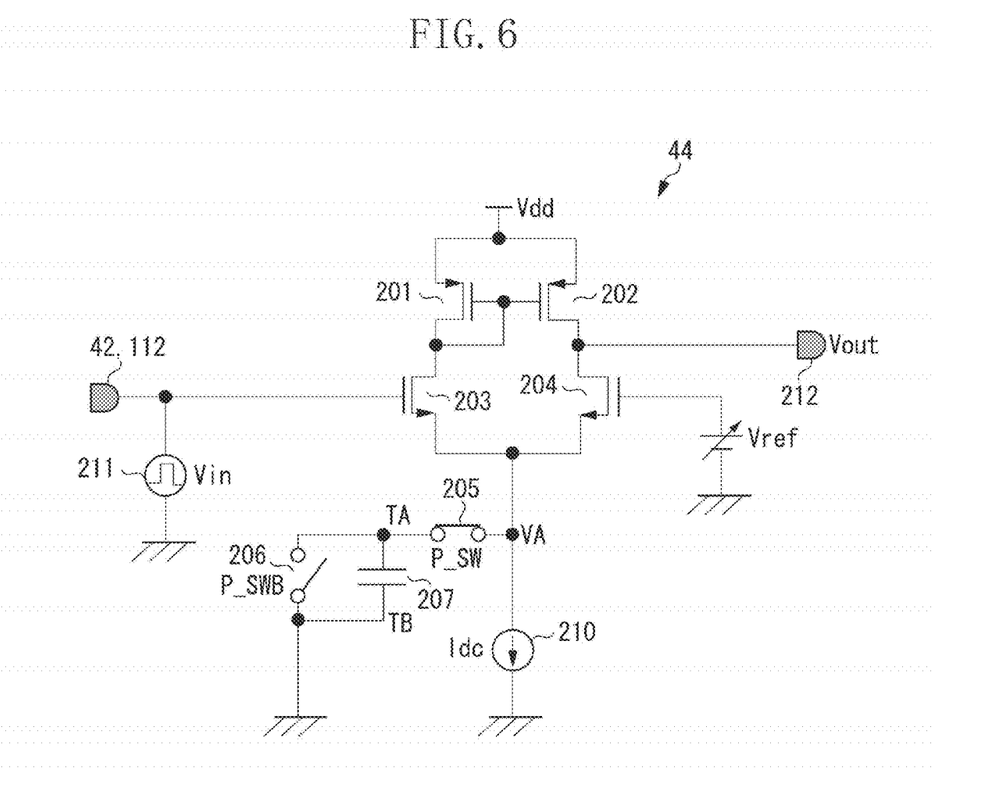
FIG. 6 is an equivalent circuit diagram of an imaging device.

A differential amplifier circuit used in an imaging device according to a third exemplary embodiment is described. FIG. 6 is an equivalent circuit diagram of the comparison unit 44 illustrated in FIG. 1. Portions having the same functions as those in FIG. 2 are denoted with the same reference numerals, and will not be described in detail. Differences from FIG. 2 are described herein.

In the present exemplary embodiment, the differential amplifier circuit is used as a comparator and does not include the negative feedback network formed by the capacitor element 208 and the capacitor element 209 illustrated in FIG. 2. The signal from the output line 112 or the signal from the column amplifier 42 is input to the gate of the transistor 203 (first input node). The reference signal Vref, used for AD conversion, is input to the gate of the transistor 204 (second input node). For example, the reference signal Vref is a ramp signal. The other configuration is the same as that in the first exemplary embodiment, and thus will not be described.

Also in the present exemplary embodiment, a high slew rate can be achieved without increasing the power consumption in the differential amplifier circuit, as in the first exemplary embodiment. The configuration of selectively supplying the first voltage or the second voltage to the second terminal TB of the capacitor element 207 as in the second exemplary embodiment may be added to the present exemplary embodiment.

Figure 7:
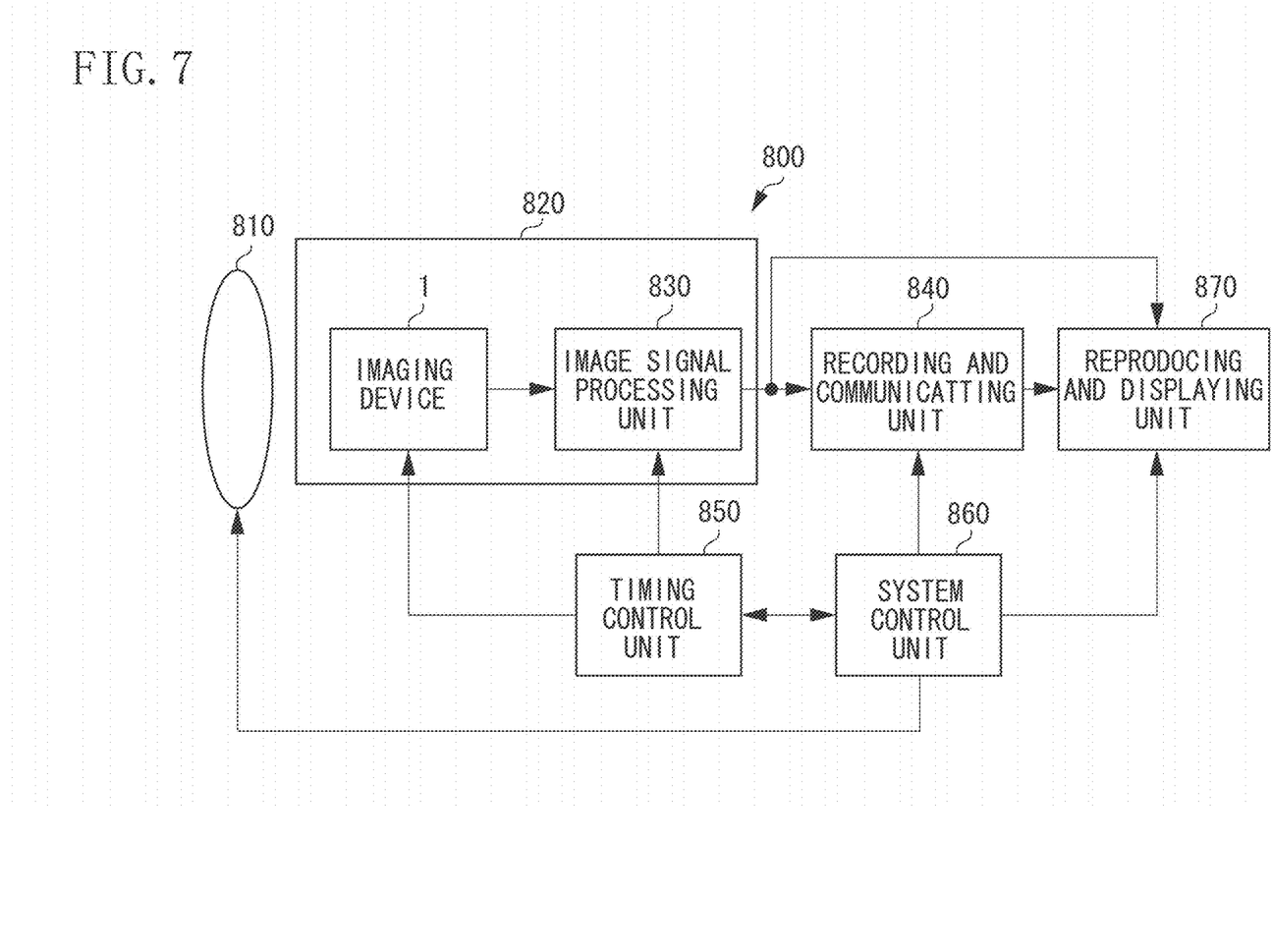
FIG. 7 is a diagram illustrating a configuration of a photoelectric conversion system.

FIG. 7 illustrates a configuration of an imaging system according to a fourth exemplary embodiment. For example, this imaging system 800 includes an optical unit 810, an imaging device 1, an image signal processing unit 830, a recording and communicating unit 840, a timing control unit 850, a system control unit 860, and a reproducing and displaying unit 870. The imaging apparatus 820 includes the imaging device 1 and the image signal processing unit 830. The imaging device described above in the exemplary embodiments is used as the imaging device 1.

The optical unit 810 that is an optical system such as a lens that focuses light, from an object, on the pixel array 10A including the plurality of pixels 10 that is two dimensionally arranged, so that an image of the object is formed. The imaging device 1 outputs a signal corresponding to the light focused on the pixel array 10A at a timing based on a signal from the timing control unit 850. The signal output from the imaging device 1 is input to the image signal processing unit 830, and the image signal processing unit 830 executes signal processing in accordance with a method defined by a program and the like. A signal, obtained as a result of the processing executed by the image signal processing unit 830, is transmitted as image data to the recording and communicating unit 840. The recording and communicating unit 840 transmits a signal for forming an image to the reproducing and displaying unit 870, whereby the reproducing and displaying unit 870 reproduces and displays a moving image or a still image. The recording and communicating unit 840 receives the signal from the image signal processing unit 830, and communicates with the system control unit 860, and further performs an operation of recording the signal for forming an image in a recording medium (not illustrated).

The system control unit 860 performs overall control on the operations of the imaging system, and controls driving of the optical unit 810, the timing control unit 850, the recording and communicating unit 840, and the reproducing and displaying unit 870. For example, the system control unit 860 includes a storage device (not illustrated) that is a recording medium storing a program and the like required for controlling the operations of the imaging system and the like. For example, the system control unit 860 supplies a signal, for switching a drive mode, in the imaging system in accordance with a user operation. Specific examples include changing of a row as a target of reading and resetting, changing of the field of angle in accordance with electronic zooming, shifting of the field of angle in accordance with electronic image stabilizing. The timing control unit 850 controls drive timings of the imaging device 1 and the image signal processing unit 830, based on control performed by the system control unit 860.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-115240, filed Jun. 5, 2015, which is hereby incorporated by reference herein in its entirety.

What is claimed is:

1. An imaging device comprising:
   a photoelectric conversion unit;
   a differential amplifier circuit including a plurality of transistors forming a differential pair and a current source supplying a bias current to the plurality of transistors, and configured to receive a signal based on charge generated by the photoelectric conversion unit;
   a capacitor element including a first terminal and a second terminal;
   a first switch connecting the first terminal to an electric path between the current source and the plurality of transistors; and
   a second switch connecting the first terminal to a voltage supply node supplied with a voltage,
   wherein the first switch and the second switch operate in phases opposite to each other.

2. The imaging device according to claim 1, wherein a timing at which the first switch transfers is synchronized with a timing at which a level of the signal changes.

3. The imaging device according to claim 1, wherein a first voltage and a second voltage, which is different from the first voltage, are selectively supplied to the second terminal.

4. The imaging device according to claim 3,
   wherein the first voltage is supplied to the second terminal when the first switch is ON, and
   wherein the second voltage is supplied to the second terminal when the first switch is OFF.

5. The imaging device according to claim 3, further comprising:
   a third switch connecting the second terminal to a node supplied with the first voltage; and
   a fourth switch connecting the second terminal to a node supplied with the second voltage.

6. The imaging device according to claim 5,
   wherein the first switch and the third switch operate in a same phase, and
   wherein the second switch and the fourth switch operate in a same phase.

7. The imaging device according to claim 3, wherein, when the voltage supplied to the second terminal is switched from the first voltage to the second voltage, voltage of the first terminal changes in such a manner that charge current flowing into the capacitor element increases.

8. The imaging device according to claim 1,
   wherein the plurality of transistors are N-type channel transistors, and
   wherein the voltage supply node is a ground node.

9. The imaging device according to claim 8, wherein the second terminal is connected to the ground node.

10. The imaging device according to claim 1,
    wherein the plurality of transistors are P-type channel transistors, and
    wherein the voltage supply node is a power supply node.

11. The imaging device according to claim 10, wherein the second terminal is connected to the power supply node.

12. The imaging device according to claim 1, wherein the voltage supplied to the voltage supply node is set in such a manner that a voltage of a source of one of the plurality of transistors is set to be a value between the voltage supplied to the voltage supply node and a voltage of a gate of the one of the plurality of transistors.

13. The imaging device according to claim 1, wherein the differential amplifier circuit forms a comparison unit configured to compare the signal with a reference signal.

14. The imaging device according to claim 1, wherein the differential amplifier circuit forms an inverting amplifier circuit configured to amplify the signal.

15. The imaging device according to claim 1, further comprising a plurality of pixels each including the photoelectric conversion unit,
    wherein the plurality of pixels forms a pixel array including a plurality of pixel columns, and
    wherein a plurality of the differential amplifier circuits is provided for the respective plurality of pixel columns.

16. An imaging system comprising:
    the imaging device according to claim 1, and
    a signal processing device configured to process a signal from the imaging device.

17. An imaging device comprising:
a photoelectric conversion unit;
a differential amplifier circuit including a plurality of transistors forming a differential pair and a current source supplying a bias current to the plurality of transistors, and configured to receive a signal based on charge generated by the photoelectric conversion unit;
a capacitor element including a first terminal and a second terminal;
a first switch connecting the first terminal to an electric path between the current source and the plurality of transistors; and
a second switch connecting the first terminal to a voltage supply node supplied with a voltage
wherein a first voltage and a second voltage, which is different from the first voltage, are selectively supplied to the second terminal.

18. The imaging device according to claim 17, wherein a timing at which the first switch transfers is synchronized with a timing at which a level of the signal changes.

19. The imaging device according to claim 17,
wherein the first voltage is supplied to the second terminal when the first switch is ON, and
wherein the second voltage is supplied to the second terminal when the first switch is OFF.

20. The imaging device according to claim 17, further comprising:
a third switch connecting the second terminal to a node supplied with the first voltage; and
a fourth switch connecting the second terminal to a node supplied with the second voltage.

21. The imaging device according to claim 20,
wherein the first switch and the third switch operate in a same phase, and
wherein the second switch and the fourth switch operate in a same phase.

22. The imaging device according to claim 17, wherein, when the voltage supplied to the second terminal is switched from the first voltage to the second voltage, voltage of the first terminal changes in such a manner that charge current flowing into the capacitor element increases.

23. The imaging device according to claim 17,
wherein the plurality of transistors are N-type channel transistors,
wherein the voltage supply node is a ground node, and
wherein the second terminal is connected to the ground node.

24. The imaging device according to claim 17,
wherein the plurality of transistors are P-type channel transistors,
wherein the voltage supply node is a power supply node, and
wherein the second terminal is connected to the power supply node.

25. The imaging device according to claim 17, wherein the voltage supplied to the voltage supply node is set in such a manner that a voltage of a source of one of the plurality of transistors is set to be a value between the voltage supplied to the voltage supply node and a voltage of a gate of the one of the plurality of transistors.

26. The imaging device according to claim 17, wherein the differential amplifier circuit forms a comparison unit configured to compare the signal with a reference signal.

27. The imaging device according to claim 17, wherein the differential amplifier circuit forms an inverting amplifier circuit configured to amplify the signal.

28. The imaging device according to claim 17, further comprising a plurality of pixels each including the photoelectric conversion unit,
wherein the plurality of pixels forms a pixel array including a plurality of pixel columns, and
wherein a plurality of the differential amplifier circuits is provided for the respective plurality of pixel columns.

29. An imaging system comprising:
the imaging device according to claim 17, and
a signal processing device configured to process a signal from the imaging device.

* * * * *